US008839140B2

(12) United States Patent
Nassar (10) Patent No.: US 8,839,140 B2
(45) Date of Patent: Sep. 16, 2014

(54) PIVOT SEARCH RESULTS BY TIME AND LOCATION

(75) Inventor: Aladdin A. Nassar, Santa Clara, CA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 12/126,608

(22) Filed: May 23, 2008

(65) Prior Publication Data
US 2009/0293011 A1 Nov. 26, 2009

(51) Int. Cl.
*G06F 3/048* (2013.01)
*G06F 17/30* (2006.01)

(52) U.S. Cl.
CPC .... *G06F 17/30241* (2013.01); *G06F 17/30867* (2013.01); *G06F 17/3087* (2013.01); *G06F 17/30973* (2013.01)
USPC ............................ 715/781; 715/780; 715/783

(58) Field of Classification Search
USPC .................................. 715/761, 778, 779, 780
See application file for complete search history.

(56) References Cited

U.S. PATENT DOCUMENTS

| | | | | |
|---|---|---|---|---|
| 5,944,768 A | * | 8/1999 | Ito et al. | 701/200 |
| 5,944,769 A | * | 8/1999 | Musk et al. | 701/201 |
| 5,948,040 A | * | 9/1999 | DeLorme et al. | 701/201 |
| 5,990,886 A | * | 11/1999 | Serdy et al. | 715/752 |
| 6,067,500 A | * | 5/2000 | Morimoto et al. | 701/209 |
| 6,650,998 B1 | | 11/2003 | Rutledge et al. | |
| 6,922,633 B2 | | 7/2005 | Takenaka | |
| 7,161,502 B2 | | 1/2007 | Yamada et al. | |
| 7,327,349 B2 | * | 2/2008 | Robbins et al. | 345/156 |
| 7,734,412 B2 | * | 6/2010 | Shi et al. | 701/421 |
| 7,917,866 B1 | * | 3/2011 | Karam | 715/810 |
| 8,032,297 B2 | * | 10/2011 | Jakobson | 701/426 |

(Continued)

FOREIGN PATENT DOCUMENTS

| | | |
|---|---|---|
| EP | 1065615 A2 | 3/2001 |
| JP | 2001282827 A | 10/2001 |

(Continued)

OTHER PUBLICATIONS

Notification of Transmittal of The International Search Report and the Written Opinion of the International Searching Authority in International Application No. PCT/US2009/039092, dated Jan. 7, 2010, 11 pgs.

(Continued)

*Primary Examiner* — William Titcomb
(74) *Attorney, Agent, or Firm* — Tom Wong; Jim Ross; Micky Minhas (57) ABSTRACT

Aggregating temporal information and location information to form a collective query. A search query is received from a user to identify search results. Temporal information and location information associated with the query inputs from information sources are received. One or more search results associated with the received query are identified in response to and as a function of the one or more query inputs, the received temporal information and the received location information. One or more graphical identifiers on a map are provided representing the one or more identified results. Each one or more provided graphical identifiers has at least one corresponding temporal identifiers on a calendar such that selecting one graphical identifier on the map focuses a corresponding one temporal identifier on the calendar or selecting one temporal identifier on the calendar selects a corresponding one graphical identifier on the map.

20 Claims, 7 Drawing Sheets

(56) References Cited

U.S. PATENT DOCUMENTS

| | | | |
|---|---|---|---|
| 8,171,424 B1* | 5/2012 | Karam | 715/810 |
| 2003/0045301 A1 | 3/2003 | Wollrab | |
| 2003/0200192 A1 | 10/2003 | Bell et al. | |
| 2004/0143573 A1 | 7/2004 | Burkey et al. | |
| 2004/0225635 A1 | 11/2004 | Toyama et al. | |
| 2005/0015731 A1* | 1/2005 | Mak et al. | 715/779 |
| 2005/0073443 A1 | 4/2005 | Sheha et al. | |
| 2005/0091096 A1 | 4/2005 | Coates et al. | |
| 2005/0114191 A1 | 5/2005 | Atkin et al. | |
| 2005/0172230 A1* | 8/2005 | Burk et al. | 715/716 |
| 2007/0033166 A1 | 2/2007 | Trowbridge et al. | |
| 2007/0157119 A1* | 7/2007 | Bishop | 715/810 |
| 2007/0174770 A1 | 7/2007 | Safoutin | |
| 2007/0192116 A1* | 8/2007 | Lovitt | 705/1 |
| 2008/0021777 A1* | 1/2008 | Mack et al. | 705/14 |
| 2008/0082578 A1 | 4/2008 | Hogue et al. | |
| 2008/0168369 A1* | 7/2008 | Tadman et al. | 715/764 |
| 2008/0235578 A1* | 9/2008 | Heed et al. | 715/269 |
| 2009/0100018 A1* | 4/2009 | Roberts | 707/3 |
| 2009/0100375 A1* | 4/2009 | Kujda | 715/788 |
| 2009/0128483 A1* | 5/2009 | Robbins et al. | 345/156 |
| 2009/0177644 A1* | 7/2009 | Martinez et al. | 707/5 |
| 2009/0204925 A1* | 8/2009 | Bhat et al. | 715/778 |
| 2009/0293014 A1* | 11/2009 | Meuninck et al. | 715/810 |

FOREIGN PATENT DOCUMENTS

| | | |
|---|---|---|
| JP | 2003130664 A | 5/2003 |
| JP | 2003150620 A | 5/2003 |
| JP | 2004287827 | 10/2004 |
| KR | 10-0525617 B1 | 11/2005 |

OTHER PUBLICATIONS

Abstract for KR 525617 B, published Nov. 3, 2005, Assignee: NHN Corp.

Chanezon, Patrick, "GCalMap: Mashup Google Maps and Calendar," available at http://blog.chanezon.com/articles/2006/07/13/gcalmap-mashup-google-maps-and-calendar, printed on Feb. 8, 2008, 5 pages.

Cooper, Jason, "Google Mashup Editor," available at http://code.google.com/support/bin/answer.py?answer=71750&topic=12044, Jun. 2007, 11 pages.

Unknown, "Local Events Browser," available at http://local.yahooapis.com/eb/, printed on Feb. 8, 2008, 2 pages.

Unknown, "Displaying Google Calendar Events on a Map," available at http://blogs.open.ac.uk/Maths/ajh59/012594.html, Jan. 26, 2008, 6 pages.

European Search Report, European Application No. 09751060.6 dated Apr. 3, 2013, 7 pages.

Gibson et al., Google Maps Hacks, O'Reilly Meida Inc., Sebastopol, CA, pp. 121-123.

* cited by examiner

PIVOT SEARCH RESULTS BY TIME AND LOCATION

BACKGROUND

Online or web search engines have become indispensible when browsing the World Wide Web. Due to the ever-increasing number and variety of contents on the Internet, web search engines have been developed to retrieve a plethora of information. Also, such search engines are able to target specific types of information. For example, online users can now search location-based information by searching a particular location or business within a particular geographical region. Online users can also target search within categories such as scholarly papers or the like.

These existing search engines typically provide a long list of potential items that are related to the searched query. The list may be displayed in a text format, in a graphical format or a combination of text and graphical format. The results may also be sorted by a determined relevancy score or other criteria. For targeted searches, such as a location or a driving direction between two locations, the search results typically include a map and turn-by-turn descriptions of the drive route.

While the quality of search results are improving, one fundamental limitation remains a hurdle to many search engines. The search results continue to be one dimensional. For example, suppose a user wishes to search for car dealerships close to the user's home location by just type "car dealerships," current search engines would only provide a list of search results, in text format, showing the most relevant results to the searched terms. To further narrow the search results, the user may revise the search term by entering "car dealerships Seattle," or select one of the search results from the provided list. The list may either link another web page or an address where the car dealership is located.

These one dimensional results have a number of deficiencies including a lack of ability to expand the scope of the searched terms in a geographical or location dimension and/ or in a temporal dimension.

SUMMARY

Embodiments of the invention overcome at some of the deficiencies of prior art by providing pivot or aggregated search results that automatically include temporal and location information when displaying the search results. Embodiments of the invention, depending on the relevance of the search query, provide the search results in a combination of a map and a calendar such that a user can readily and easily locate and identify the desirable search results. Alternative aspects of the invention further provide a term scope library defining additional temporal or location information for any given search terms entered by the user.

For example, aspects of the invention permit expanding the scope of the searched terms in a geographical or location dimension and/or in a temporal dimension. In other words, when the user searches for "car dealers," the user receives the results in a map with graphical identifiers showing where the car dealers are located. In addition, the search engine can automatically narrow the searches to a geographical region near where the user resides or where the user conducts the search.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention provide pivot summarization or aggregation of temporal information and location information in providing search results in response to a received search query. Currently, users of online search engines are forced to think one-dimensional by entering terms in mutually exclusive scope or dimension (e.g., general search, time/calendar, map/location) at a time. However, human brains do not think that way and there is a reason why we say "an image is worth a thousand words."

Figure 1:
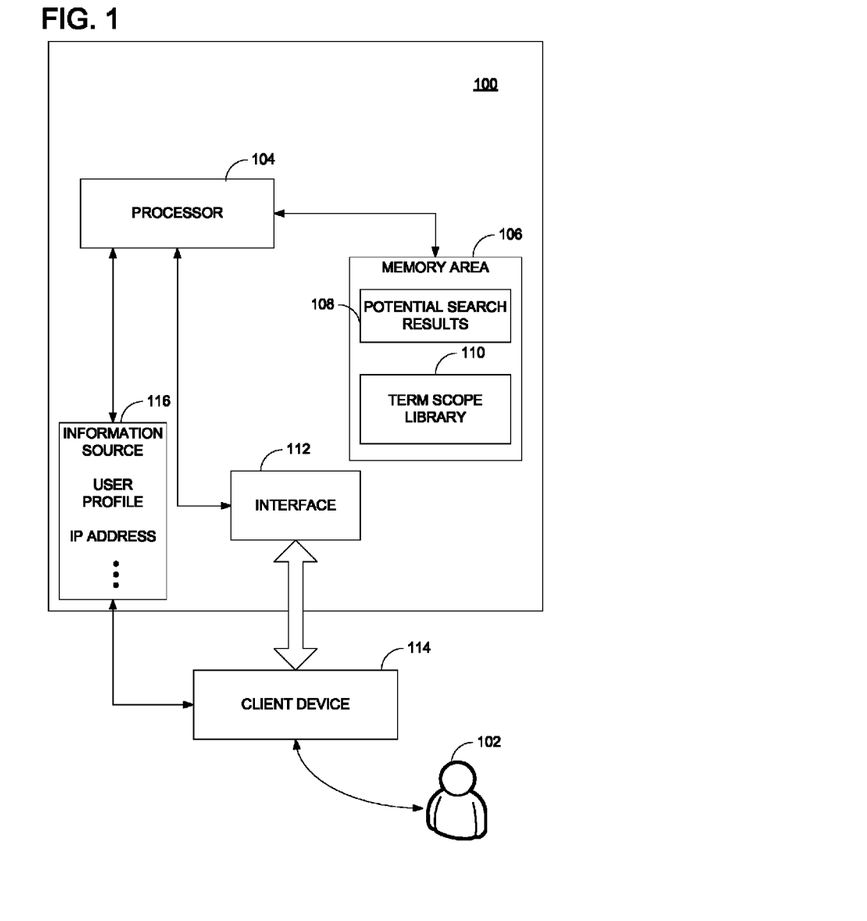
FIG. 1 is an exemplary embodiment of a block diagram illustrating a system for aggregating temporal information and location information from sources to form a collective query according to an embodiment of the invention.

FIG. 1 is a block diagram illustrating a system 100 for automatically aggregating temporal information and location information from sources to form a collective query according to an embodiment of the invention. For example, the system 100 may be a computer or a group/collection of computers for processing online search queries. In one example, the system 100 may include one or more front-end servers, one or more back-end servers, and one or more database servers. The system 100 may also include one or more web servers, one or more authentication servers, or other specialized servers for providing search results in response to a query from a user 102.

The system 100 also includes a processor 104. For example, the processor 104 may be a central processing unit (CPU), a microprocessor, or other processing units that are capable of execute computer-executable instructions. The system 100 also includes a memory area 106 for storing data for the system 100. The memory area 106 stores, among other things, a term scope library 110. The term scope library 110 defines a temporal scope or a location scope for one or more terms in the library 110. In one example, the memory area 106 includes computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the system 100.

The system 100 also includes an interface 112 for interacting with a client device 114 of the user 102. The client device 114 may be a personal computer, a personal digital assistant, a smart phone, a cellular phone, or other digital devices with displays that are capable to connect to the Internet. For example, the interface 112 may include a web page having elements in the web page for receiving one or more search queries from the user 102 and for providing the one or more search results to the user 102. The system 100 also includes an information source 116. The information source 116 may be another data store storing information such as a user profile having personal information associated with the user 102. In one embodiment, the information source 116 may gather information from external sources at a geographical location remote from that of the system 100. For example, the information source 116 may retrieve or obtain information from the client device 114, such as default location information, default time zone location, default IP address, IP history, and previous search queries. In another embodiment, this information may be included in the user profile. In the example of the user profile, the system 100 may be a federated or enterprise computer system where a number of services is provided to the user 102. As such, the user 102 may maintain the user profile when the user 102 logs in or authenticates to one service provided as part of the enterprise system. Therefore, the user profile includes a variety of information related to the user 102. In a further embodiment, the information source 116 may also be geographically located remotely from that of the system 100. In an alternative embodiment, the information source 116 is coupled with the memory area 106 such that the information from the information source 116 may be an input to the memory area 106 for assisting or providing search results in response to search queries from the user 102. In one example, the user 102 may be a human user.

FIGS. 2 to 5 illustrate displays of a graphical user interface (GUI) showing search results with aggregated temporal and/or location information according to an embodiment of the invention. FIGS. 2 to 5 will also be discussed below in conjunction with the system 100 in FIG. 1 to describe various aspects of the invention. In one embodiment, operations below are incorporated and implemented as computer-executable instructions and to be executed by the processor 104 of the system 100.

Figure 2:
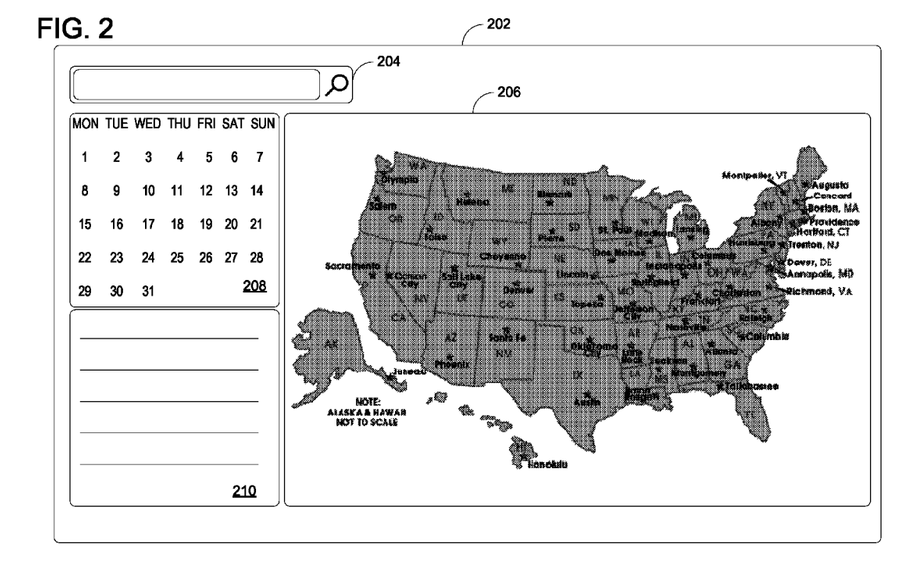
FIGS. 2-5 are exemplary block diagram illustrating displays of a graphical user interface (GUI) showing search results with aggregated temporal and/or location information according to an embodiment of the invention.

Initially, the interface 112 displays a web page or a page 202 having a first display area 204 receiving search inputs or queries from the user 102, a second display area 206 displaying a map, and a third display area 208 for displaying a calendar. In one example, the first display area 204 includes a search bar for receiving the search queries or search inputs from the user 102. In another embodiment, the page 202 also includes a fourth display area 210 displaying additional information of a search result in response to a selection on the calendar in the third display area 208 or a selection on the map in the second display area 206.

Figure 3:
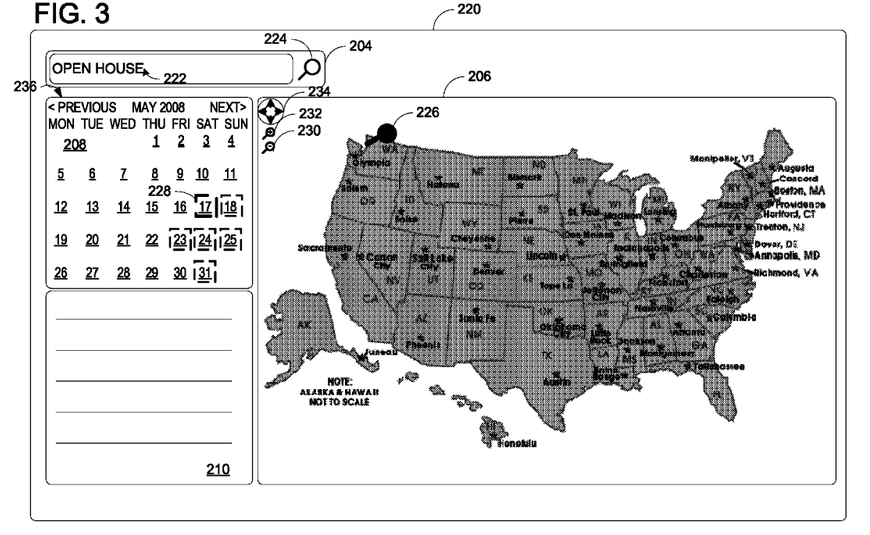

Referring now to FIG. 3, a display 220 illustrating embodiments of the invention in processing a user query in action. In this example, the user 102 wishes to search for terms 222 "open house." The search terms 222, in this example, includes one or more search inputs, such as "open" and "house." These search terms 222 convey or define a semantic message that the user 102 wishes to find out residential house sales and when and where the houses are available for viewing to the public. It is to be understood other terms or inputs may be entered without departing from the scope or spirit of embodiments of the invention.

Once the user enters the search terms 222, the user 102 may, via an input device coupled to the client device 114, select a search activation control or button 224 to send the search terms 222 to the processor 104 for processing. The processor 106 receives the search terms 222 and attempts to identify one or more search results most relevant to the search terms 222. In one embodiment, in identifying the most relevant search results, the processor 104 receives temporal information or location information from the information source 116. In this example, the processor 104 receives temporal information or location information from a user profile which may include user's internet protocol (IP) address, the time of the date when the search query is provided, or the like. In another embodiment, the processor 104 may identify the temporal or location information when receiving the search terms 222. For example, when the search terms 222 are received, the processor 104 may have already received such information from the client device 114 via the interface 112. In another embodiment, the processor 104 may receive the temporal or location information from the client device 114 by sending a cookie or other electronic tracking files to the client device 114.

In one example, for the time/temporal dimension, the time horizon may be inferred from the search queries or search terms and may be learnt from user's clicks on similar searches in the past. For example, the memory area 106 or the user profile in the information source 116 may store the past search results or search queries for the user 102. Upon receiving a new search queries, the processor 104 may first review the user profile for relevant queries or results for determining the time or temporal horizon. In another embodiment, the client device 114 may also store similar information locally and may be provided the temporal information to the processor 104. As such, a feedback from the client device 114 may be provided to the processor 104. In another example, search queries such as "open houses" and "garage sales" are usually intended for the "upcoming weekend". As such, either the term scope library 110, the user profile in the information source 116, or the client device 114 may provide temporal information to the processor 104. Similarly, concerts or conferences may inherently involve a temporal dimension or scope of one to two months in advance. Also, in one embodiment, implicit in the time dimension is today's date and it can be obtained from various sources, such as the clock maintained by the processor 104, the client device 114, or the like.

It is to be understood that based on the temporal dimension or scope, the potential search results will vary accordingly. Hence, the temporal information acts as a filter such that if the user 102 searches the same thing a month from now, the user 102 will receive different results going forward. Also, for past events, such as "election 2004," the search results identified will be associated with the events in the past. Similar, search queries such as historical events or stock market news may be inherently include a temporal information in the past.

In another embodiment, for the location dimension, it is to be understood that embodiments of the invention are not limited to infer the IP Address of the client device 114. The inference may include, without limitation, location(s) where the user 102 typically zooms in on maps, directions stored or saved in the user profile, or the searches users did over the last 3 months. In an alternative embodiment, a heuristics engine may be used to study user's search behaviors or habits and provide suggested location information.

Once the processor 104 receives the temporal and location information associated with the search terms 222, the processor 104 identifies one or more search results from the memory area 106 (e.g., potential search results data store). In the example illustrated in FIG. 3, the search terms 222 are "open house," the temporal information (from the client device 114 or other sources described above) is May 11, 2008, and the location information (from the client device 114, other sources, IP address, or the like) is Seattle, Wash., USA. In response to the search terms 222, the temporal information, and the location information, embodiments of the invention identify one or more search results as a function of the received search terms 222, the temporal information, and the location information.

In response to the identified results, embodiments of the invention provide the search results to the user 102. Unlike previous implementations where the search engines typically just display a list of text-based search results. However, embodiments of the invention improve over the existing technologies by aggregating the temporal information and location information (or spatial information) to the search terms so that aspects of the invention may provide a more holistic and richer user experience to the user 102. In so doing, the temporal dimension and the spatial dimension of a given search results are provided to the user 102 in an intuitive manner.

As such and as depicted in FIG. 3, a pin or a graphical identifier 226 is displayed on the map of the second display area. At the same time, a temporal identifier 228 is also displayed on the calendar of the third display area such that the graphical identifier 226 corresponds to the temporal identifier 228. It is to be understood that only one graphical identifier 226 and only one temporal identifier 228 are displayed for illustration purposes and not for limitation. The number of graphical identifiers or temporal identifiers depends on the search terms 222, the temporal information, the location information, and/or the volume of the potential search results data store.

In further detail, the graphical identifier 226 corresponds to the temporal identifier 228. As such, a selection of the graphical identifier 226 results in focusing or selecting the temporal identifier 228 (as evident from the bolded selection box around the date May 17). Similarly, a selection of the temporal identifier 228 results in focusing or selecting the graphical identifier 226. As such, embodiments of the invention enable the user 102 to view the search results in a concise and convenient manner because the search results intelligently display the most relevant information. Instead of showing a long list of search results that are relevant to the terms "open house," embodiments of the invention use graphical identifiers on the map and the temporal identifiers on the calendar to clearly convey where and when sales of residential houses are available for viewing to the public. The user 102 no longer needs to click through a series of links before finding out when or where the relevant search results may have the information.

In one embodiment, the map in the second display area 206 may include one or more map related controls, such as zoom out 230, zoom in 232, directional focus 234, or the like. These additional controls effectively place additional criteria to the already retrieved or identified search results. As such, the zoom out control 230, the zoom in control 232, and the direction focus control 234 may act as a filter to the results by geographical proximity within a certain radius from the location information. Similarly, the calendar in the third display area 208 may include a control 236 to change a time focus to a previous calendar month or a next calendar month. This control 236 may act as a temporal filter to further refine the identified search results. Other controls associated with the calendar or the map may be available to the user 102 without departing from the scope of the aspects of the invention.

Figure 4:
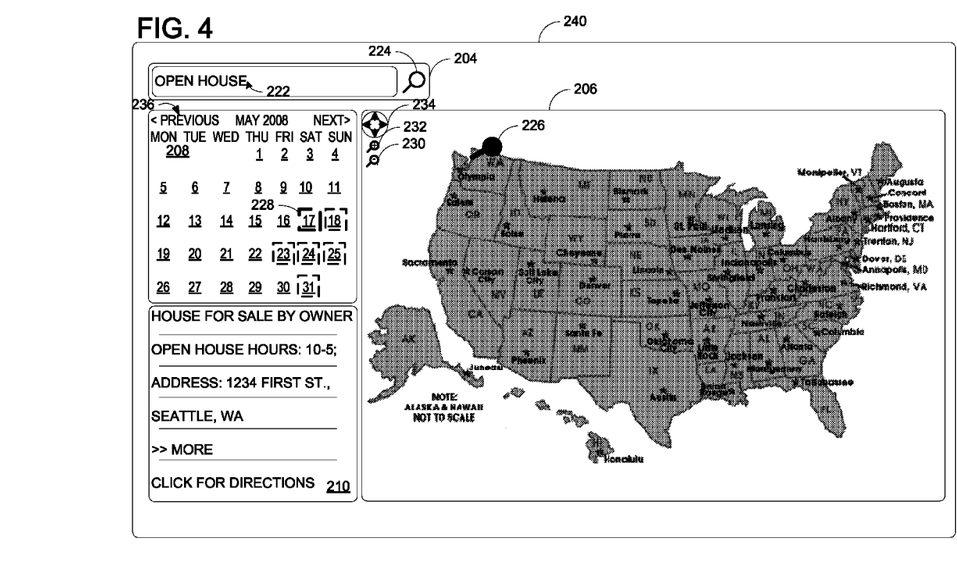

Referring now to FIG. 4, another display 240 illustrates another embodiment of the invention with a fourth display area 210 displaying additional detail of the search results in response to a selection of the graphical identifier 226 or the temporal identifier 228. For example, suppose the user 102 selects the graphical identifier 226 on the map in the first display area 206, aspects of the invention in this embodiment not only focuses or selects the one or more temporal identifiers 228 corresponding to the graphical identifier 226, but also displays any additional information in the fourth display area 210. In this example, the following additional information is provided:

House for sale by owner; Open house hours: 10-5;
Address: 1234 First St.,
Seattle, Wash.
>>more
Click for directions Thus, the user 102 not only receives the where the open house for this particular house is located, but also when the viewing of the house is available. Embodiments of the invention also provide and enable the user 102 to retrieve any relevant information by providing links for the direction to the open house location and/or other information, such as neighborhood area information, school information, hospital information, or the like.

Figure 5:
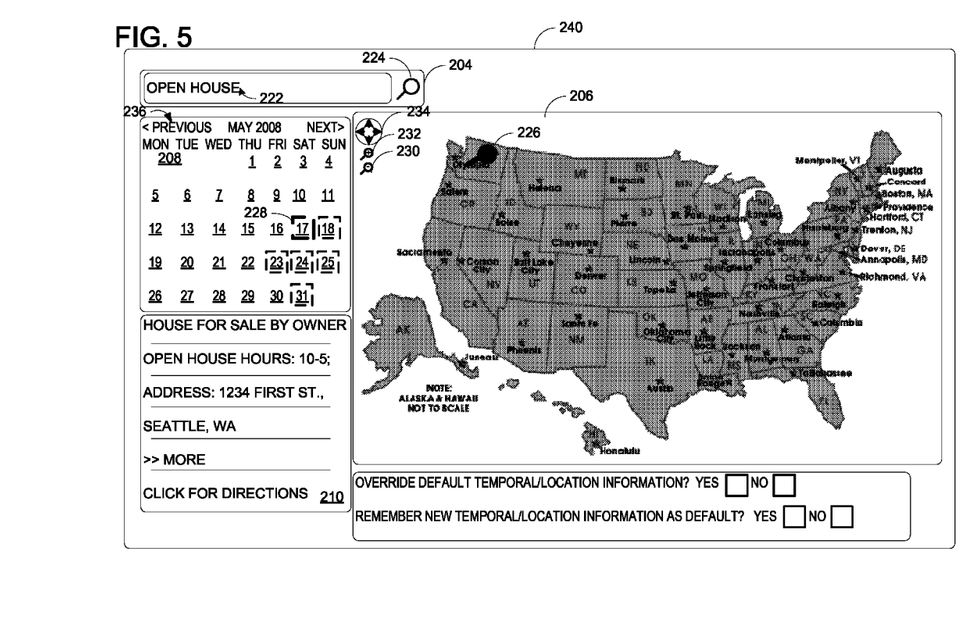

Referring now to FIG. 5, an alternative embodiment of the invention enable to the user to alter the received or default temporal information or location information. For example, the processor 102, without user input, may automatically use the IP address of the client device 114 of the user 102 as the location information and the time information from the system 100 as the temporal information by default. However, the user 102 may wish to look up information that is targeted to another geographical location or time. For example, the user 102 may wish to look up open house information for a relative who lives hundreds of miles away. As such, aspects of the invention may provide a window 244 requesting the user 102 if the user wishes to modify the default or current location/temporal information. The window 244 may also display a dialog message requesting whether the user 102 wishes to set a new and perhaps permanent temporal and/or location information for all subsequent searches. In another embodiment, such modification or changes may also be stored in the user profile for later retrieval.

It is to be understood that, while the displays in FIGS. 2 to 5 include the first display area 204, the second display area 206, the third display area 208 and the fourth display area 210, embodiments of the invention and the GUI illustrated in FIGS. 2 to 5 may be incorporated into other interface elements without departing from the scope of embodiments of the invention.

Figure 6:
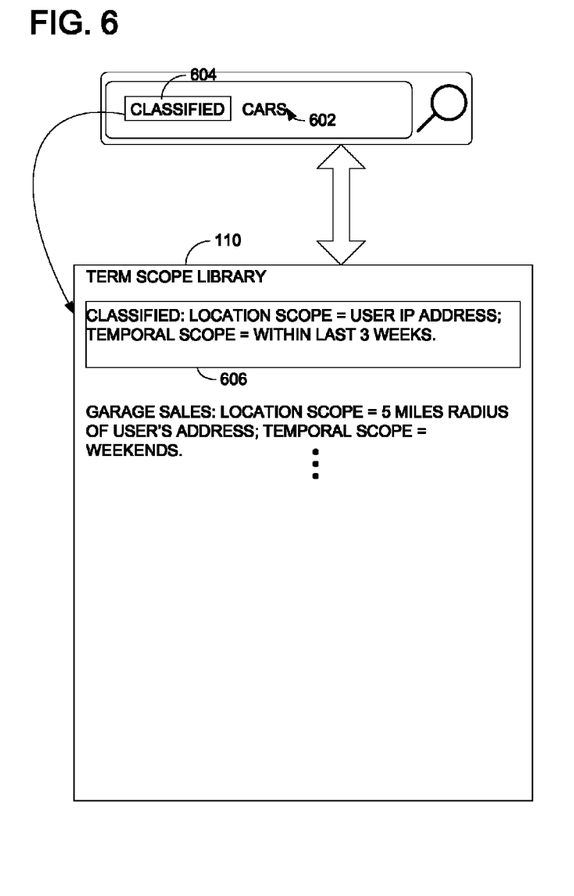
FIG. 6 is a block diagram illustrating a semantic analysis of a search term in a search query for determining a temporal scope or a location scope according to an embodiment of the invention.

Referring now to FIG. 6, a block diagram illustrates a semantic analysis of a search term in a search query for determining a temporal scope or a location scope according to an embodiment of the invention. In one example, a search query 602 includes one or more search terms, such as the search term 604, "classified." In this example, the processor 102 analyzes the search term 604 by comparing the search term 604 against one of the terms in the term scope library 110. As described above, the terms scope library 110 defines a temporal scope or a location scope for one or more terms. The term scope library 110 may define the temporal scope or the location scope based on user past search experiences (e.g., from the user profile) or based on cookies sent to and retrieved from the client device 114. As such, the term scope library 110 may define a location scope of user IP address and a temporal scope of within last 3 weeks for the term "classified" at 606. The term scope library 110 may include additional terms, and the temporal scope and the location scope may be expressed in various formats or syntax (e.g., executable expressions) such that the processor 104 may consume or apply the temporal scope and location scope in formulating the search results in response to the search query 602.

Figure 7:
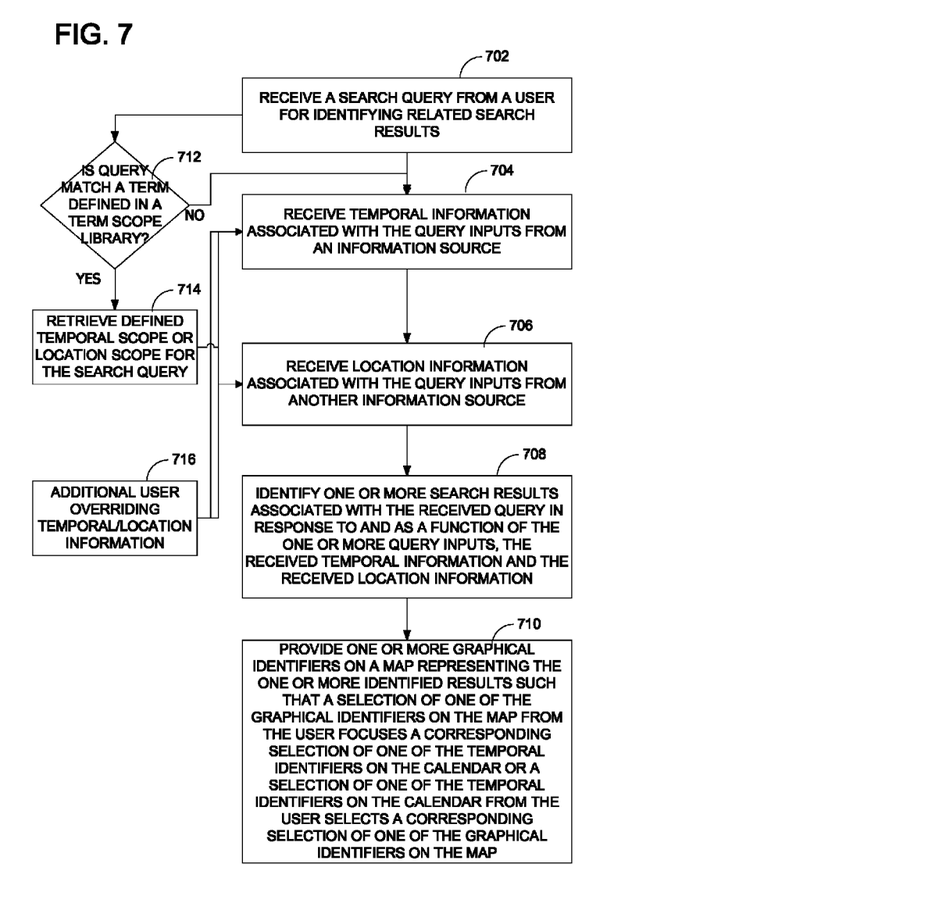
FIG. 7 is an exemplary flow chart illustrating operation of aggregating temporal information and location information from sources to form a collective query according to an embodiment of the invention.

FIG. 7 is an exemplary flow chart illustrating operation of aggregating temporal information and location information from sources to form a collective query according to an embodiment of the invention. At 702, a search query is received from a user for identifying related search results. The search query includes one or more query inputs and the query inputs are unrestricted to location-based only searches. Temporal information associated with the query inputs is received from an information source at 704. The information source is independent of or separate from the query inputs. At 706, location information associated with the query inputs is received from another information source, and the other information source is also independent of or separate from the query inputs. In one embodiment, the other information source and the information source are at least a part of a user profile.

One or more search results associated with the received query are identified in response to and as a function of the one or more query inputs, the received temporal information and the received location information at 708. At 710, one or more graphical identifiers are provided on a map representing the one or more identified results. Each one or more provided graphical identifiers has at least one corresponding temporal identifiers on a calendar such that a selection of one of the graphical identifiers on the map from the user focuses a corresponding selection of one of the temporal identifiers on the calendar or a selection of one of the temporal identifiers on the calendar from the user selects a corresponding selection of one of the graphical identifiers on the map.

In another embodiment, a determination is made at 712 as to whether the one or more query inputs match one of the terms in the term scope library in the memory area. If the determination is negative, embodiments of the invention proceed to receive the temporal information and/or the location information at 704. On the other hand, if the determination is positive, defined temporal scope or location scope information is retrieved from the term scope library at 714. In a further alternative embodiment, additional user overriding information may be provided (e.g., modifying default temporal and location information) or received at 716.

In operation, the example below illustrates workings of embodiments of the invention. Suppose the user wishes to search for "Concerts in the SF Bay Area". The user would enter that phrase in the search box and the results will show as pins on the map and events on the calendar. Each pin to which has a corresponding event tied on the calendar, and details of the result may be posted in the Details Pane. If the user clicks on a day, week or month, the corresponding locations for those events are highlighted or focused on the map. If the user clicks on a pin or group of pins on the map, the corresponding calendar dates are highlighted or focused. The Detail Pane in all scenarios shows what the users selected on either the map or calendar.

Embodiments of the invention provide a rich user experience by displaying results in an easy, straightforward and intuitive manner. Users in the scenario above did not have to say they wanted this information for today or next week. The user may even decide not to enter the words "SF Bay Area." The user may also change the map zoom and the corresponding calendar events will filter in/out accordingly without ever need to click on the typical "advanced" button to filter or gain access to advanced search options. Users can also easily merge their personal/work calendars for the week with events they are interested in along with the maps and details associated with them—all in one page.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including system 100 and/or client device 114, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, system 100 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for aggregating temporal information and location information from a plurality of sources to form a collective query, said method comprising:

receiving a search query from a user, said search query including one or more query inputs for identifying search results related thereto, said query inputs being unrestricted to location-based only searches;

receiving temporal information from an information source independent of receiving the search query;

receiving location information from another information source independent of receiving the search query;

identifying one or more search results associated with the received search query in response to and as a function of the one or more query inputs, the received temporal information, and the received location information;

displaying, to the user, a map of a geographic region associated with the received search query, said map being responsive to one or more map-related controls for changing the geographic region displayed by one or more of zooming in on a portion of the map, zooming out on a portion of the map, and repositioning the map;

displaying, to the user, a calendar associated with the received search query, said calendar being responsive to one or more calendar-related controls for changing a time focus displayed;

providing one or more graphical identifiers on the map, said graphical identifiers on the map representing the one or more identified search results within the geographic region, each of said one or more graphical identifiers on the map having one or more temporal identifiers on the calendar corresponding thereto, wherein a selection from the user of one of the graphical identifiers on the map focuses a corresponding selection of one of the temporal identifiers on the calendar and a selection from the user of one of the temporal identifiers on the calendar focuses a corresponding selection of one of the graphical identifiers on the map;

receiving a user-selection of one or more of the map-related controls and changing the geographic region displayed on the map in response thereto;

receiving a user-selection of one or more of the calendar-related controls and changing the time focus displayed on the calendar in response thereto;

filtering the identified search results based on the change in the geographic region displayed on the map; and further filtering the identified search results based on the change in the time focus displayed on the calendar, wherein the user-selection of the calendar-related controls acts as a time filter to further refine the temporal identifiers based on the change in the time focus displayed on the calendar, said user-selections of the map-related controls and the calendar-related controls placing additional filter criteria on the one or more identified search results represented by one or more graphical identifiers and the temporal identifiers corresponding thereto for updating the displayed map to represent the filtered search results.

2. The method of claim 1, further comprising, in response of the focus, providing additional text information of the one or more identified results on a detail information area.

3. The method of claim 1, wherein receiving the location information comprises identifying one of the following: location information from the user, internet protocol (IP) address information, and location information from the information source.

4. The method of claim 1, wherein receiving the temporal information comprises identifying one of the following: temporal information from the user, temporal information from the other information source, temporal information when the search query is received, and temporal information when the one or more results are identified.

5. The method of claim 1, wherein the information source and the other information source comprise a user profile associated with the user.

6. The method of claim 5, wherein the user profile includes at least one of the following: default location information, default time zone location, default IP address, IP history.

7. The method of claim 1, further comprising receiving a user input in addition to the received search query from the user, said user input identifying an overriding temporal information and an overriding location information, and wherein identifying comprises identifying the one or more results associated with the received query in response to and as a function of the one or more query inputs, the overriding temporal information and the overriding location information.

8. The method of claim 1, further comprising analyzing the one or more included query inputs in the search query to define a temporal information and a location information, and wherein identifying comprises identifying the one or more results associated with the received query in response to and as a function of the one or more query inputs, the received temporal information, the received location information, the defined temporal information and the defined location information.

9. A system for aggregating temporal information and location information from a plurality of sources to form a collective query, said system comprising:
an interface for receiving a search query from a user, said search query including one or more query inputs for identifying search results related thereto, said query inputs being unrestricted to location-based only searches, said user having a user profile associated therewith, said user profile storing search queries previously received from the user;
a memory area storing a term scope library, said stored term scope library defining, prior to the search query being received, one or more terms, a temporal scope corresponding to at least one of the terms, and a location scope corresponding to at least one of the terms;
a processor configured to execute computer-executable instructions for:
determining whether the one or more query inputs match one of the terms in the term scope library in the memory area;
when it is determined from the determining that the one or more query inputs match the one or more terms in the term scope library, identifying one or more search results associated with the received query in response to and as a function of the one or more query inputs, the corresponding temporal scope, the corresponding location scope, and the search queries stored in the user profile;
providing, via the interface, one or more graphical identifiers on a map of a geographic region displayed to the user, said graphical identifiers representing the one or more identified search results, each of said one or more graphical identifiers on the map having one or more temporal identifiers on a calendar corresponding thereto, wherein the processor is configured to select a corresponding selection of one of the temporal identifiers on the calendar in response to a selection from the user of one of the graphical identifiers on the map and the processor is further configured to select a corresponding selection of one of the graphical identifiers on the map in response to a selection from the user of one of the temporal identifiers on the calendar, said map being responsive to one or more map-related controls for changing the geographic region displayed on the map by at least one of zooming in on a portion of the map, zooming out on a portion of the map, and repositioning the map to change the geographic region displayed, said calendar being responsive to one or more calendar-related controls for changing a time focus displayed;
receiving, via the interface, a user-selection of one or more of the map-related controls and changing the geographic region displayed on the map in response thereto;
receiving, via the interface, a user-selection of one or more of the calendar-related controls and changing the time focus displayed on the calendar in response thereto; and
filtering the identified search results based on the change in the geographic region displayed on the map and based on the change in the temporal range displayed on the calendar prior to displaying the filtered search results to the user, said user-selections of the map-related controls and the calendar-related controls placing additional filter criteria on the one or more identified search results to filter the one or more identified search results represented by the one or more graphical identifiers and the temporal identifiers corresponding thereto for updating the displayed map to represent the filtered search results based on the updating of the displayed map.

10. The system of claim 9, wherein the interface is further configured to receive a user input in addition to the received search query from the user, said user input identifying an overriding temporal information and an overriding location information, and wherein identifying comprises identifying the one or more results associated with the received query in response to and as a function of the one or more query inputs, the overriding temporal information and the overriding location information.

11. The system of claim 9, wherein the interface further comprises:
temporal information received from a first information source separate from the search query; and
location information received from a second information source separate from the search query.

12. The system of claim 11, wherein the processor is configured to identify the one or more results associated with the received query in response to and as a function of the one or more query inputs, the received temporal information and the received location information when it is determined from the determining that the one or more query inputs do not match the one or more of the terms in the term scope library.

13. The system of claim 11, wherein the received temporal information comprises one of the following: temporal information from the user, temporal information from the other information source, temporal information when the search query is received, and temporal information when the one or more results are identified.

14. The system of claim 11, wherein the processor is configured to provide additional text information of the one or more identified results on a detail information area in response to the processor selecting the corresponding selection of the one of the temporal identifiers on the calendar, and wherein the interface displays the detail information area for the user.

15. The system of claim 11, wherein at least one of the first information source and the second information source comprises the user profile associated with the user.

16. The system of claim 11, wherein the user profile includes at least one of the following: default location information, default time zone location, default IP address, and IP history.

17. A method for displaying a graphical user interface (GUI) comprising:
providing a first display area for receiving search inputs from a user for identifying search results related to the received search inputs, said search inputs being unrestricted to location-based only searches;
receiving temporal information and location information based on the user's search history from a user profile associated with the user prior to the search inputs being received, said information source being separate from the search inputs;
identifying one or more search results associated with the received search inputs in response to and as a function of the search inputs, the received temporal information, and the received location information;

providing a second display area for displaying a map of a geographical region, said map having graphical identifiers, said map responsive to one or more map-related controls to change the geographical region shown in the displayed map;

providing a third display area for displaying a calendar having temporal identifiers, said calendar responsive to one or more calendar-related controls to change a time focus displayed on the calendar, wherein each of the graphical identifiers on the map in the second display area corresponds to at least one of the temporal identifiers on the calendar in the third display area, wherein a selection from the user of one of the graphical identifiers on the map selects a corresponding selection of one of the temporal identifiers on the calendar or a selection from the user of one of the temporal identifiers on the calendar selects a corresponding selection of one of the graphical identifiers on the map; and receiving, via the GUI, a user-selection of one of the map-related controls for changing the geographical region shown in the displayed map and a user-selection of one of the calendar-related controls for changing the time focus displayed on the calendar, said user-selection of the map-related controls placing filter criteria on the one or more identified search results to filter the identified search results prior to displaying the identified search results to the user and to change the geographic region displayed, said user-selection of the calendar-related controls placing additional filter criteria on the one or more identified search results to filter the identified search results prior to displaying the identified search results to the user and to change the time focus displayed on the calendar, wherein an updated map is displayed to represent the filtered search results based on the user-selection of the map-related and the calendar-related controls.

18. The method of claim 17, further comprising analyzing the search inputs in the first display area to define a temporal information and a location information, and wherein identifying comprises identifying the one or more results associated with the received query in response to and as a function of the one or more query inputs, the received temporal information, the received location information, the defined temporal information and the defined location information.

19. The method of claim 17, further comprising providing a fourth display area for displaying additional information of the search results in response a selection of one of the graphical identifiers on the map or a selection of one of the temporal identifiers on the calendar.

20. The method of claim 17, wherein the information source includes at least one of the following: default location information, default time zone location, default IP address, IP history, an additional user input of temporal information, and an additional input of location information.

* * * * *